US005392992A

United States Patent [19]

Farnsteiner et al.

[11] Patent Number: 5,392,992

[45] Date of Patent: Feb. 28, 1995

[54] LOW PRESSURE PAINT SPRAY GUN WITH IMPROVED SPRAY HEAD

[75] Inventors: Irmgard Farnsteiner, Monaco, Monaco; Philippe Lafitte, Cagnes Sur Mer, France

[73] Assignees: S.I.C.M.O. Societe Industrielle; Commerciale de materiel & d'Outillage, both of Monaco

[21] Appl. No.: 180,057

[22] Filed: Jan. 11, 1994

[30] Foreign Application Priority Data

Jul. 21, 1992 [FR] France ................................ 92 09264

[51] Int. Cl.[6] .......................... B05B 1/28; B05B 7/06; F16J 15/00

[52] U.S. Cl. .................................... 239/296; 239/311; 239/526; 239/417.3; 239/418; 239/424.5; 277/35; 277/62; 277/117

[58] Field of Search ............... 239/290, 296, 310, 311, 239/318, 375, 526, 407, 416.5, 417.3, 418, 423, 424, 424.5; 277/35, 62, 106, 117, 205

[56] References Cited

U.S. PATENT DOCUMENTS

| | | | |
|---|---|---|---|
| 2,334,396 | 11/1943 | Dorward, Jr. | 277/35 X |
| 2,843,425 | 7/1958 | Paasche | 239/416.3 X |
| 3,024,048 | 3/1962 | Kobert | 277/35 X |
| 3,232,540 | 2/1966 | Cassanmagnago | 239/418 X |
| 3,301,191 | 1/1967 | Warren | 277/62 X |
| 3,589,612 | 6/1971 | Shaffer | 239/600 X |
| 3,785,659 | 1/1974 | Maurer et al. | 277/35 |
| 3,814,328 | 6/1974 | Warning | 239/296 X |
| 3,913,844 | 10/1975 | Petrovic | 239/526 |
| 5,181,729 | 1/1993 | Forssberg et al. | 277/62 |
| 5,267,693 | 12/1993 | Dickey | 239/526 X |

FOREIGN PATENT DOCUMENTS

| | | | |
|---|---|---|---|
| 0389657 | 10/1990 | European Pat. Off. . | |
| 60-226661 | 11/1985 | Japan . | |
| 522351 | 6/1940 | United Kingdom . | |
| 594913 | 11/1947 | United Kingdom . | |

*Primary Examiner*—Andres Kashnikow
*Assistant Examiner*—Lesley D. Morris
*Attorney, Agent, or Firm*—Young & Thompson

[57] ABSTRACT

A paint spray gun comprises a body having a compressed air supply to atomize paint from a paint source external to the gun. The gun has a needle which is spring urged forwardly and retractable by a trigger to control the opening and closing of a nozzle in a spray head. There are two sealing joints between the needle and the body of the spray gun, and they surround a portion of the needle which is upstream from the paint in the direction that the paint flows along the needle and out the nozzle. A sealing cartridge comprises a cylindrical body enclosing the two sealing joints surrounding the needle, and a prestressed compression spring surrounds the needle and is disposed between the two joints and urges the two joints away from each other against solid surfaces that deflect the joints into sealing contact with the needle. A needle support in the form of a single piece opens at one end in the spray head and at its other end contains the sealing cartridge. This needle support has a perpendicular passageway between its open end and the cartridge, through which paint arrives from the paint source.

4 Claims, 2 Drawing Sheets

LOW PRESSURE PAINT SPRAY GUN WITH IMPROVED SPRAY HEAD

FIELD OF THE INVENTION

The invention has for its object a low pressure paint spray gun of which particularly the spray head is improved.

The head is completely sealed at the needle and the needle carrier. In use, the needle or rod always remains centered thanks to the circular support of the needle. The repairs and maintenance are therefore more reliable and rapid.

BACKGROUND OF THE INVENTION

The state of the art can be defined by the following patents:

FR-A-1.460.927. The invention has for its object improvements in paint spray guns, and more particularly in their projection noses, and it concerns particularly the following points:

1) The combination of a liquid nozzle having an axial outlet and a multiplicity of radially diverging outlets about it, with a cap disposed to form annular air injection nozzles about each of these outlets;
2) The addition, in front of the cap, of a member forming by its internal wall about the central outlet, an air injection nozzle and outlet of the corresponding mixture, and, by its external wall, a deflector pressing down against the spray jets supplied by the divergent outlets of the nozzle, said air jets passing through holes pierced through the cap about said member to stir the mixture supplied by the divergent outlets.

FR-A-2.194.135. Paint spray gun, characterized by the fact that the compressed air inlet in the channel of the handle is formed by a nozzle forming with its internal walls of said channel, a Venturi in which the secondary air drawn from outside ambient atmosphere, arrives by orifices provided in the Venturi about said nozzle.

EP 0 467 334. A sealing joint for an axle and an improved air valve for a portable paint spray gun, the joint having radial play with the securement axle except on the surface of the joint sealed along a limited axial length. The sealed joint of the axle has a radially conical surface external to the securement surface of the shaft so as to provide a sealing surface and for the transfer of axial forces from this surface in a radial direction permitting actuating the surface of the sealing joint relative to the axle. A second conical surface of the joint provides for the maintenance of the joint on the pneumatic spring of the air valve when the paint spray gun is dismounted. An improved air valve for portable paint spray guns is also described, having rigid axial means and a radial support supporting a portion of a relatively flexible rim and adapted to permit disengaging a conical sealed surface within the spray gun.

FR-A-2.548.555. Spray gun for paint, lacquer or analogous products, provided with a body in which are provided a nozzle for supply of the product to be pulverized, a needle for opening the closure of the orifice of said nozzle, a cap for drawing in air and a distribution ring for the air, or deflecting ring. According to the invention, this spray gun is characterized in that said air cap is fixed to said deflecting ring in a removable fashion.

FR-A-2.525.320. The invention relates to a joint adapted to ensure sealing of the fluids on the needle valves, spindles and other movable cylindrical objects. This joint comprises a packing which has a tubular end cut so as to have a sharp edge, and an abutment element which has a conical recess receiving the end, this latter and the recess surrounding the movable cylindrical object. A spring and a washer exert axial pressure on the packing inwardly of the cavity. Field of application: joints for paint spray guns, etc.

At present, sealing between the needle support or rod and the needle is ensured by pressure packing or by a sealing joint. This seal must prevent any passage of the product to be pulverized into the body of the spray gun.

According to the products to be pulverized, it is necessary to change the needle, however, there are always variations of diameter of the needles. In this case, it is absolutely necessary to again clamp the pressure packing; each manipulation of screwing or of unscrewing of the packing degrades the latter. Sealing problems rapidly arise, and the maintenance requires dismounting the spray gun assembly to recover the rest of the joint or pressure packing. These operations are therefore long and costly.

SUMMARY OF THE INVENTION

So as to improve the seal at the needle, the needle support of the present invention has a specific circular shape which ensures the permanent centering of the needle even after several changes of the needle. At present, the needle support is of T shape; this shape does not permit ensuring automatic centering of the needle after each manipulation.

The nut or pressure packing is replaced by a cartridge comprising two joints opposed between a prestressed spring.

The spray gun according to the invention is a paint spray gun of the type using compressed air which arrives in the body of the spray gun to pulverize the paint which is sent under pressure from an external source or a lower or upper paint bag of the body of said spray gun, a needle valve with a spring actuated by a trigger controls the opening or closing of the nozzle of the spray head, wherein the sealing means that ensures sealing between the space in which the needle is in contact with the paint and the body of the spray gun in which the needle is not in contact with the paint and this while ensuring the axial displacement of the rod, is a sealing cartridge comprised by a cylindrical body serving as a sleeve or a bearing in which are emplaced two opposite joints between which is disposed a prestressed spring, said sealing cartridge being disposed in a recess provided for this purpose in the body of the spray gun, the assembly being traversed along its longitudinal axis by the needle valve.

The sealing is improved by the needle support. The needle support comprises a circular sleeve through which passes the needle and on which is screwed, at one end, the spray nozzle and, at its other end, is disposed the sealing cartridge; from said sleeve proceeds in a perpendicular direction a passage which permits connecting the inlet channel for paint, while from the base of the sleeve proceeds a circular tube which is provided to occupy and be disposed within the hollow cylindrical space of the body of the spray gun and, by this fact, to center automatically the needle which is supported by said support.

BRIEF DESCRIPTION OF THE DRAWINGS

The accompanying drawings are given by way of examples and are not limiting. They show a preferred embodiment according to the invention. They will permit easy comprehension of the invention.

DETAILED DESCRIPTION OF THE INVENTION

Figure 1:
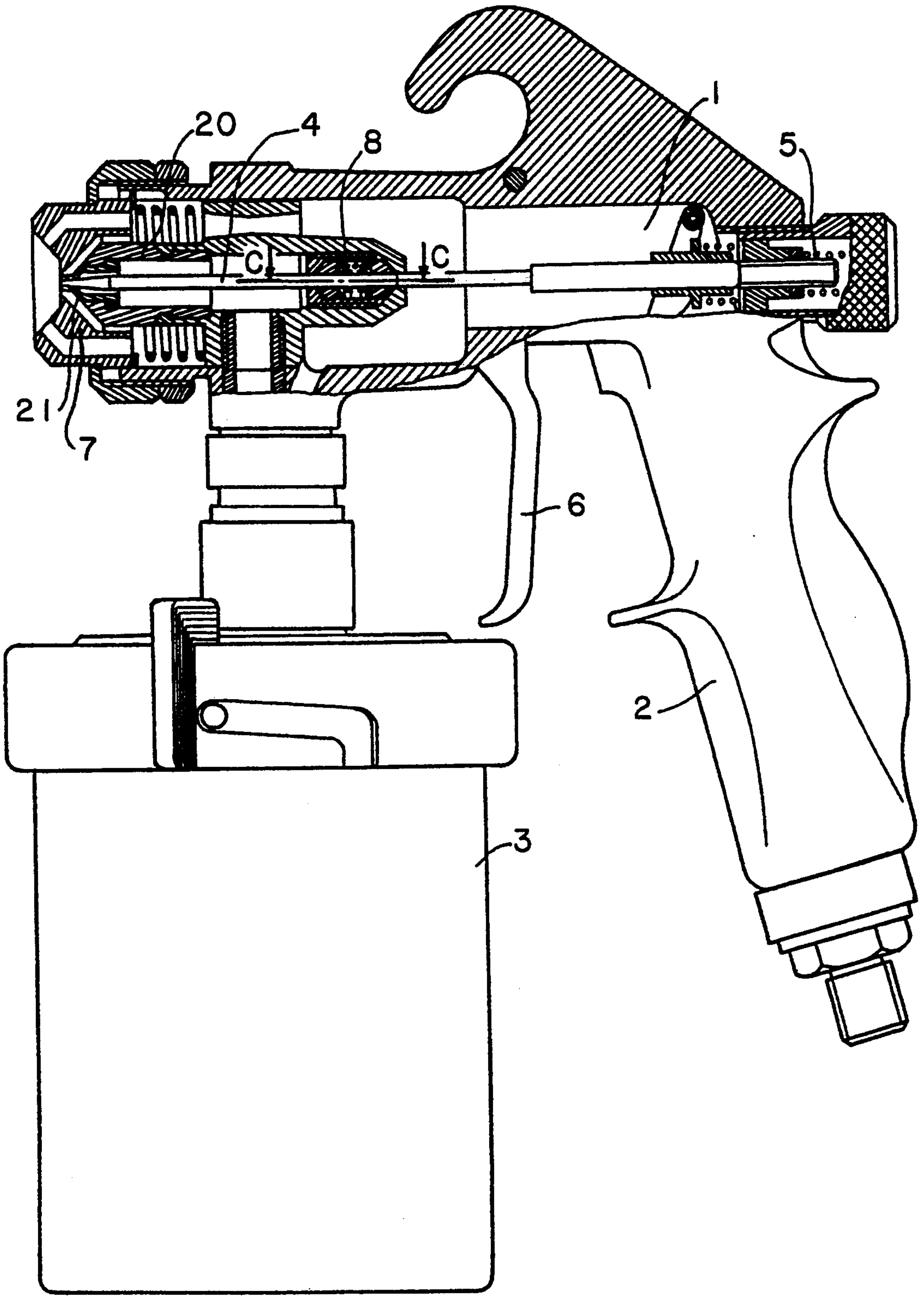
FIG. 1 is an assembly view of the paint spray gun from which is suspended a paint container.
Figure 4:
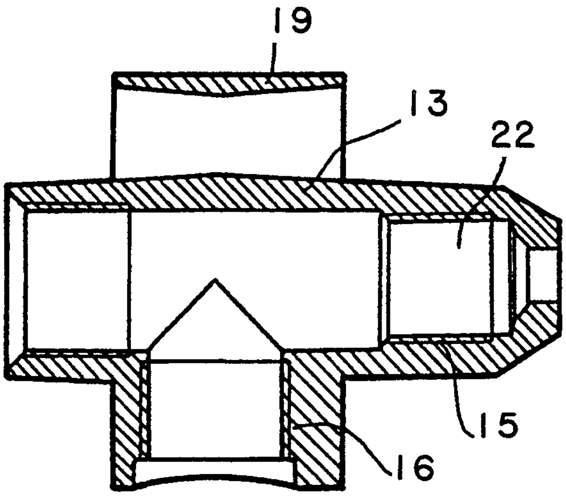
FIG. 4 is a cross-sectional view on the line B—B of FIG. 3.
Figure 3:
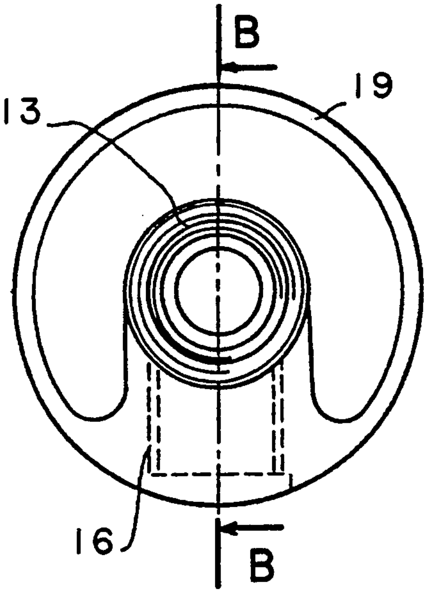
FIG. 3 is an end view of the needle support showing the circular tube which facilitates centering the needle and the needle support.
Figure 2:
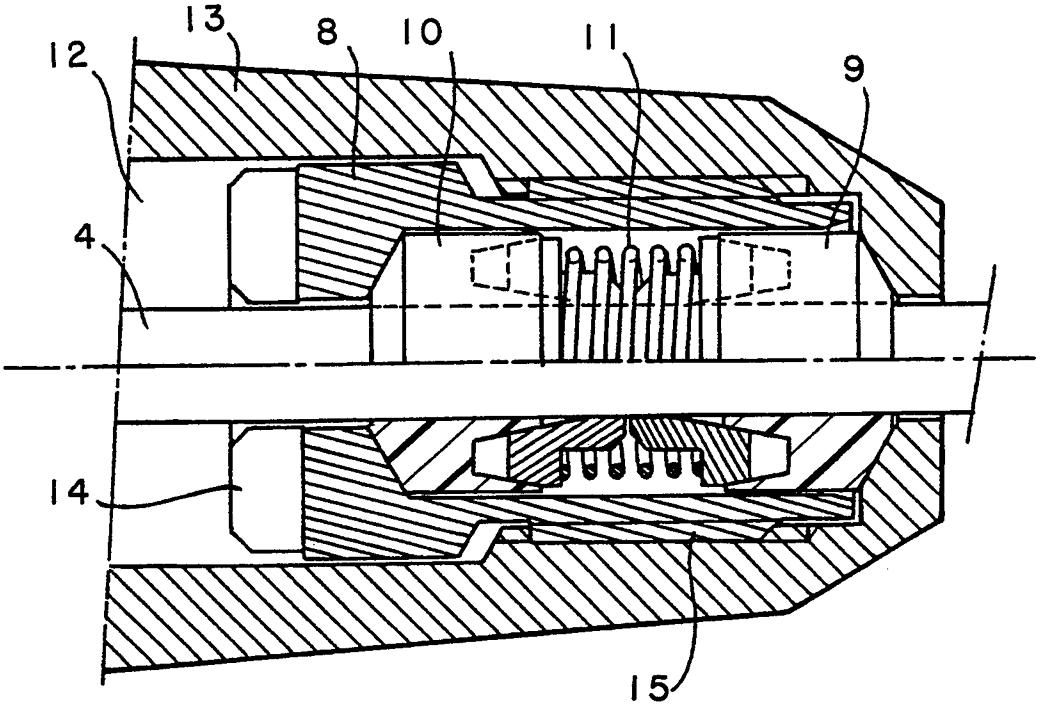
FIG. 2 is a cross-sectional view along the line C—C of FIG. 1 of the sealing cartridge.

The paint spray gun is of the type using compressed air which arrives in the body 1 of the spray gun by the handle 2 or is connected to the compressed air valve. This compressed air arrives in the body 1 of the spray gun to pulverize the paint which is sent under pressure from a container 3 of paint which is suspended from the body 1 of said spray gun. A needle valve with a spring 5, actuated by a trigger 6, controls the opening or closing of the needle of the spray head 7.

The seal between the needle 4 and the body 1 is ensured by pressure packing. This pressure packing is a sealing cartridge 8 comprised by a cylindrical body serving as a sleeve or bearing in which are emplaced two joints 9, 10 opposite each other and between which is disposed a prestressed spring 11. Said sealing cartridge is disposed in a recess 12 provided for this purpose in the body 1 of the spray gun at the support 13 for the needle 4. The assembly is traversed by the needle 4.

The joint 9 is maintained against a shoulder of the needle support 13. The other joint 10 is maintained by a locking screw 14 which maintains said joint 10 locked and which, being screw threaded at its periphery 15, screws into the corresponding screw-threaded portion of the needle support 13, whereby rotation of locking screw 14 changes the distance between the joints thereby to vary the compression of the spring and hence the sealing pressure between the joints and the needle.

Sealing is also improved by the support 13 of the needle 4 which comprises a circular sleeve through which passes the needle 4 from end to end. One end of said sleeve receives the sealing cartridge 8, while the other or downstream end receives the nozzle or spray head 7 with its nozzle nose 21.

From the sleeve proceeds a perpendicular passageway 16 which permits connecting the inlet channel of the paint to a connection tube.

From the base of the sleeve of the support 13 of the needle 4 proceeds a tube or circular ring 19 which is provided to occupy and to be disposed in the hollow cylindrical space of body 1 of the spray gun and, because of this circular ring 19, to center automatically the needle support 13 and the needle 4, each time the apparatus is mounted and remounted for maintenance and cleaning.

What is claimed is:

1. In a paint spray gun comprising a body having a compressed air supply to atomize paint from a paint source external to the gun, the gun having a needle which is spring urged forwardly and retractable by a trigger to control the opening and closing of a nozzle in a spray head on the gun; the improvement comprising sealing means between the needle and the body of the spray gun, said sealing means surrounding a portion of the needle which is upstream from the paint relative to the direction that the paint flows along the needle and out the nozzle, said sealing means comprising a sealing cartridge having a cylindrical body enclosing two sealing joints surrounding the needle, and prestressed compression spring means surrounding the needle and disposed between the two joints and urging the two joints away from each other against solid surfaces that deflect the joints into sealing contact with the needle, and a needle support in the form of a circular sleeve through which the needle passes from end to end, one end of said sleeve receiving the sealing cartridge while the other end of the sleeve is open and receives the spray head.

2. In a paint spray gun comprising a body having a compressed air supply to atomize paint from a paint source external to the gun, the gun having a needle which is spring urged forwardly and retractable by a trigger to control the opening and closing of a nozzle in a spray head on the gun; the improvement comprising a needle support in the form of a single piece that opens at an open end in said spray head and at its other end contains a sealing cartridge through which the needle sealingly passes, said gun having a hollow cylindrical interior, said needle support having a circular tube concentric therewith and spaced radially outwardly therefrom and fixedly secured thereto for centering said needle support in said hollow cylindrical interior, and said needle support having a perpendicular passageway between said open end and said cartridge through which paint arrives from said paint source.

3. A paint spray gun according to claim 2, wherein said cartridge comprises a pair of spaced joints through which the needle passes in slidingly sealed relation, and a prestressed compression spring surrounding the needle between the joints and urging the joints away from each other against solid surfaces that deflect the joints into sealing contact with the needle.

4. A paint spray gun as claimed in claim 3, wherein said joints are disposed within a hollow cylindrical member screw-threadedly received within the paint spray gun and against which one of the joints bears, whereby rotation of said screw-threaded member changes the distance between said joints thereby to vary the compression of said spring and hence the sealing pressure between the joints and the needle.

* * * * *